(12) United States Patent
Zeyn

(10) Patent No.: US 12,066,194 B2
(45) Date of Patent: Aug. 20, 2024

(54) TEMPERATURE CONTROL SYSTEM

(71) Applicant: Klaus Zeyn, Munich (DE)

(72) Inventor: Klaus Zeyn, Munich (DE)

( * ) Notice: Subject to any disclaimer, the term of this patent is extended or adjusted under 35 U.S.C. 154(b) by 56 days.

(21) Appl. No.: 17/469,218

(22) Filed: Sep. 8, 2021

(65) Prior Publication Data

US 2021/0404670 A1 Dec. 30, 2021

Related U.S. Application Data

(63) Continuation of application No. PCT/EP2020/056184, filed on Mar. 9, 2020.

(30) Foreign Application Priority Data

Mar. 8, 2019 (DE) ...................... 10 2019 105 990.0

(51) Int. Cl.
| | |
|---|---|
| *F24D 19/02* | (2006.01) |
| *F24D 3/14* | (2006.01) |
| *F24D 13/04* | (2006.01) |
| *F24D 15/02* | (2006.01) |
| *F24D 19/06* | (2006.01) |

(52) U.S. Cl.
CPC ........... *F24D 19/0223* (2013.01); *F24D 3/14* (2013.01); *F24D 13/04* (2013.01); *F24D 15/02* (2013.01); *F24D 19/062* (2013.01); *F24D 2220/0285* (2013.01); *F24D 2220/042* (2013.01); *F24D 2220/2081* (2013.01)

(58) Field of Classification Search
CPC ...... F24D 19/0223; F24D 13/04; F24D 15/02; F24D 19/062; F24D 3/14; F24D 13/024; F24D 2220/0285; H05B 3/26; H05B 2203/032
See application file for complete search history.

(56) References Cited

FOREIGN PATENT DOCUMENTS

| DE | 3009800 A1 | 9/1981 | |
|---|---|---|---|
| DE | 3932101 A1 | 4/1991 | |
| DE | 20 2008 006 432 U1 | 8/2008 | |
| DE | 20 2015 101 047 U1 | 6/2015 | |
| DE | 202016107401 U1 | 2/2017 | |
| DE | 102016125742 A1 * | 6/2018 | ............ F24D 13/00 |
| WO | 9627271 A1 | 9/1996 | |
| WO | WO-9627271 A1 * | 9/1996 | ............ F24H 3/002 |

OTHER PUBLICATIONS

International Search Report issued for corresponding International Patent Application No. PCT/EP2020/056184 dated Jun. 2, 2020.
First Examination Report issued by the German Patent and Trademark Office for German Patent Application No. 10 2019 105 990.9, dated Feb. 10, 2020, with machine-generated English translation attached.
Second Examination Report issued by the German Patent and Trademark Office for German Patent Application No. 10 2019 105 990.9, dated Mar. 16, 2022, with machine-generated English translation attached.

* cited by examiner

*Primary Examiner* — Frantz F Jules
*Assistant Examiner* — Martha Tadesse
(74) *Attorney, Agent, or Firm* — Myers Wolin, LLC

(57) ABSTRACT

A temperature control system for controlling the temperature of a room and a composite element for a temperature control system.

10 Claims, 6 Drawing Sheets

TEMPERATURE CONTROL SYSTEM

CROSS-REFERENCE TO RELATED APPLICATIONS

This is a continuation under 35 U.S.C. § 120 of International Application PCT/EP2020/056184, filed Mar. 9, 2020, which claims priority to DE Application 10 2019 105 990.9, filed Mar. 8, 2019, the contents of each of which are incorporated by reference herein.

FIELD OF THE INVENTION

The invention relates to a temperature control system which is particularly suitable for controlling the temperature of a room, for example the room of a building, as well as a composite element for a temperature control system according to the invention for controlling the temperature of a room.

BACKGROUND OF THE INVENTION

Climate change and the resulting energy revolution that it necessitates encompass the three sectors of electrical power, heat and mobility and require a move away from fossil fuels as an energy source. As a result, conventional heating systems will become less important and will be replaced by new types of systems that can be fed by renewable energy sources.

In the prior art, various heating systems, which are still largely operated with fossil fuels today, and newer systems such as heat pumps, combined heat and power plants, solar thermal energy and others, are known. These systems are primarily based on the convection heating principle.

In these systems, a medium such as, for example, water is heated by a central heating device and then distributed via feed lines to convectors arranged in the rooms to be heated. These convectors transfer their heat to the room air by convection, wherein it should be noted that air is to be classified as a poor heat carrier.

The heated room air rises to the upper area of the room, while the colder air is distributed in the lower areas of the room where the room user is located. As a result, a high energy consumption is required for a sufficient room air temperature.

The temperature difference between the different areas of the room leads to air circulation, causing dust turbulence in the room, which is problematic for those suffering from allergies.

These disadvantages of conventional systems, which exist even with new types of electrical heating systems such as air heat pumps, lead to a high degree of inertia of the systems, which is in contradiction to the energy sufficiency required by the energy revolution (consumption and usage behavior relevant to energy consumption, e.g. through demand-specific heating profiles).

Another disadvantage of convection is that the temperature exchange between the air layers in the room causes cold air to blow over the walls, creating condensation moisture. Due to the current insulation technology in buildings using thermal insulation composite systems (ETICS) and their airtightness, the combination of convection heating and ETICS creates a breeding ground for mold growth, which can lead to health problems as well as physical building problems.

Airtightness and the risk of mold formation, especially in buildings insulated with ETICS, are countered by the use of ventilation systems. As a result, the economic and manual work involved in building projects increases.

Another disadvantage of these systems is their relatively high material costs. Along with a time-consuming installation that has to be carried out by special trades, the total costs are high, while the specific heat requirement for heating rooms is constantly being reduced due to the German Energy Saving Ordinance (ENEV). This means that the relatively high acquisition costs and the installation effort of conventional systems are no longer proportional to the heat generation required.

The effort and complexity of the installation can also be regarded as disadvantageous for these systems, since they require specially trained personnel and the increasing shortage of skilled workers results in a delay and consequently an increase in the cost of projects.

The principle of heat radiation should be seen as an alternative to convection heating. Heat radiation is a type of heat transfer in which heat is transferred by electromagnetic waves (infrared (IR) radiation, infrared light).

In contrast to convective systems, the air is not used as a heat carrier, but the walls and solid bodies in the room store the radiant heat and emit it into the room.

The thermal insulation that is primarily used in buildings today, for example by means of insulation materials based on polystyrene, leads to considerable heat losses, as these ETICS materials have an emissivity ε0.6 and thus only counteract heat losses due to radiation from the room to a limited extent.

There are different types of radiant heating systems, which are usually implemented as ohmic resistance heating. Current designs primarily have meander-shaped heating wires, wherein the application of an electrical voltage causes a current flow through the heating wire and, due to the inherent resistance of the heating wire according to Joule's first law, the electrical current generates thermal energy in the electrical conductor.

The heating wire of meander-shaped wired heating elements usually has a diameter of less than 1 mm. This means that these systems represent a very small heating surface area proportion in relation to the overall size of the heating system. As a result, a relatively large amount of energy has to be expended in order to heat the entire heating surface. This increases the energy requirements of these systems to heat an area such as a room.

A further disadvantage of the small surface area proportion of the heating wires becomes apparent when studying the Stefan-Boltzmann law of radiation. The linear influence of the heating surface area proportion on the resulting heat radiation output Qw is derived from the Stefan-Boltzmann law for calculating the radiation/heat radiation outputs of non-black bodies:

$$Q_w = \sigma * \varepsilon * A * T^4$$

with $Q_w$=heat radiation output of a body in W/m²
$\sigma$=Stefan-Boltzmann constant 5.67
$\varepsilon$=emissivity of a body
$A$=area of a body
$T$=absolute temperature of a body in K The use of, for example, polymer-based films with an embedded carbon layer for the implementation of surface heating systems, for example in the living area, where these are used, for example, in the floor and wall area, is known from other areas of technology. Here, an electrically conductive material with a defined carbon content is applied over a large area as an ohmic resistance between two current-carrying conductor tracks. By application of a voltage to the contact points of the conductor tracks, a current flow through the carbon layer takes place and, due to the inherent resistance of the carbon layer, thermal energy is generated in the electrical conductor according to Joule's first law.

OBJECT OF THE INVENTION

An object of the invention is therefore to provide solutions for controlling the temperature of a room, for example a room in a building, which at least partially avoid the disadvantages known from the prior art. It should be irrelevant here whether the building in which the temperature in the rooms is to be controlled is a new or old building. The solutions for controlling the temperature of a room should also be inexpensive and simple and easy to install and at the same time should enable more efficient, more environmentally friendly and more cost-effective temperature control of a room.

SUMMARY

According to the invention, this object is achieved by the features of the independent claims. Advantageous embodiments of the invention are set forth in the specific dependent claims.

Accordingly, a temperature control system for controlling the temperature of a room is provided, comprising
  a heating element with a surface facing the room and a surface facing away from the room,
  an insulation and/or reflection element which is arranged or can be arranged spaced apart from the heating element and on the surface of the heating element facing away from the room, so that an inner air gap is formed or can be formed between the insulation and/or reflection element and the heating element, wherein the insulation and/or reflection element is designed to be heat-insulating and reflective to IR beams, and
  a first spacer element which is arranged or can be arranged on the surface of the insulation and/or reflection element facing away from the room in order to form an outer air gap between the insulation and/or reflection element and a wall of the room.

Both air gaps, i.e. the inner air gap and the outer air gap, are accordingly formed on the side of the heating element facing away from the room.

It is advantageous if the insulation and/or reflection element is designed to be flat and reflective to IR beams on both sides.

A second spacer element can be arranged between the insulation and/or reflection element and the heating element, wherein the second spacer element preferably has an open lattice or honeycomb structure, so that the inner air gap is or can be formed within the open lattice or honeycomb structure.

It can be advantageous if a heat accumulator is or can be arranged on the surface of the heating element facing away from the room.

It can be advantageous here if the heat accumulator is arranged between the heating element and the insulation and/or reflection element and spaced apart from the insulation and/or reflection element.

A heat carrier can be arranged on the surface of the heating element facing the room.

In one embodiment of the invention the heat carrier, the heating element and the heat accumulator can be in heat-conducting contact.

In an advantageous embodiment of the invention, the heat carrier, the heating element and the heat accumulator can be designed together as a composite element.

The particular advantage here is that a particularly simple installation of the temperature control system according to the invention can be implemented by the combination of a plurality of individual elements to form a composite component which is made up of a heating element, a heat carrier and a heat accumulator, wherein the entire composite is in heat-conducting contact and heat is fed via the heating element to both the heat accumulator and also the heat carrier during the heating process.

In combination with the insulation and/or reflection element, which is preferably arranged between two air layers or between two air gaps, a temperature control system can be created which can be operated in an efficient and energy-saving manner, reduces the electrical power output for heating a room and supports heat protection in summer. This means that the temperature control system according to the invention can be used for controlling the temperature of a room, on the one hand in winter and on the other hand in summer.

The insulation and/or reflection element and optionally the second spacer element can be part of the composite element.

In this way an even higher level of integration of the temperature control system is achieved according to the invention, whereby at the same time an even simpler installation of the temperature control system according to the invention is made possible.

The invention also provides a composite element for a temperature control system according to the invention for controlling the temperature of a room, wherein the composite element comprises
  a heat carrier,
  a heating element and
  a heat accumulator
  wherein
    the heat carrier is arranged on a first side of the heating element,
    the heat accumulator is arranged on a second side of the heating element which is opposite the first side of the heating element, and
    the heat carrier, the heating element and the heat accumulator are in thermally conductive contact.

The composite element can also comprise
  an insulation and/or reflection element and
  a spacer element,
  wherein
    the insulation and/or reflection element is arranged on the side of the heat accumulator which is opposite the side on which the heating element is arranged, and
    the spacer element is arranged between the insulation and/or reflection element and the heat accumulator.

In the case of the composite element, the spacer element can form an air gap between the insulation and/or reflection element and the heat accumulator.

In the case of the temperature control system and/or in the case of the composite element, it may be advantageous if the heating element comprises
  a conductive coating to which electrical energy can be applied,
  a heating wire, in particular a meander-shaped heating wire, a water pipe, in particular a meander-shaped water pipe that can be supplied with hot water, and combinations thereof.

In this case the insulation and/or reflection element can comprise a high-gloss metal foil, in particular aluminum foil, or a composite foil which has at least one layer that reflects IR beams and at least one layer designed as an air cushion.

The temperature control system according to the invention can be used for controlling the temperature of a room, such as the room of a building, in winter and/or summer. The temperature control system according to the invention can be mounted on the wall, on the ceiling or on the floor of the room. In the temperature control system according to the invention, the heating element heats the heat carrier to generate infrared radiant heat. It is also advantageous that in the heating phase the heat accumulator absorbs heat losses from the thermal energy emanating from the heating element and the heat carrier and ensures a slower cooling phase for the composite component when the heating element is inactive. Another advantage is that in the summer period the daily maximum temperature, which passes with a time lag (phase shift) through the building shell from the outside to the inside, is only passed on to the interior in small quantities due to buffering (amplitude damping) in order to support heat protection in summer.

Due to the spaced arrangement of the insulation and/or reflection element from the wall or from the building shell and from the heating element or from the heat accumulator, on both sides of the insulation and/or reflection element an air layer or an air gap is formed (inner and outer static air layer), which effectively reduces heat displacement from the building shell or from the wall into the interior of the room and from the interior of the room to the building shell or to the wall. The insulation and/or reflection element acts as interior insulation here. Radiant heat emitted by the heating element and/or by the heat accumulator is reflected back into the room and thus radiant heat losses via the building shell or via the wall are reduced. In addition, heating of the room in summer can be reduced by using the insulation and/or reflection element to reflect exogenous radiation energy, such as solar radiation, diffuse radiation, ambient radiation and the like, to the outer shell of the building or to the wall.

The invention makes it possible to provide a kit for producing a temperature control system according to the invention.

The idea according to the invention also includes a use of such a kit for producing a temperature control system, as well as the use of a temperature control system according to the invention and/or a composite system according to the invention for controlling the temperature of a room.

A method for producing a temperature control system according to the invention is also described, the method comprising at least the following steps:

attaching a first spacer element to a building shell or to a wall for fastening an insulation and/or reflection element, attaching the insulation and/or reflection element to/on the first spacer element; and attaching a second spacer element to the insulation and/or reflection element for fastening the composite element according to the invention (provided that the insulation and/or reflection element is not already part of the composite element), wherein the spacer elements are designed to ensure a static air gap between the building shell or wall and the insulation and/or reflection element as well as a static air gap between the insulation and/or reflection element and the composite element, and an installation which is as contact-free as possible between the building shell or wall and the insulation and/or reflection element as well as between the insulation and/or reflection element and the composite element.

A method for heating a room is also described, which comprises the steps of the method for producing a temperature control system according to the invention and a further step for operating the temperature control system produced.

In one embodiment of the invention, the temperature control system and/or the composite element can be coupled to a control system, wherein the control system is adapted to detect a surface temperature of the temperature control system or the composite component and, depending on the detected surface temperature, to apply an electrical voltage to the temperature control system or the composite element. This can significantly improve the energy efficiency.

The control system can include a thermostat which measures the current surface temperature with a temperature sensor attached to the temperature control system or the composite element and, depending on whether the current surface temperature falls below or exceeds the limit values of a set switching differential (hysteresis) of the control device, activates or deactivates the voltage supply for application to the composite component.

BRIEF DESCRIPTION OF THE DRAWINGS

Further details and features of the invention as well as specific, particularly advantageous embodiments of the invention are apparent from the following description in conjunction with the drawings. In the drawings.

Figure 1:
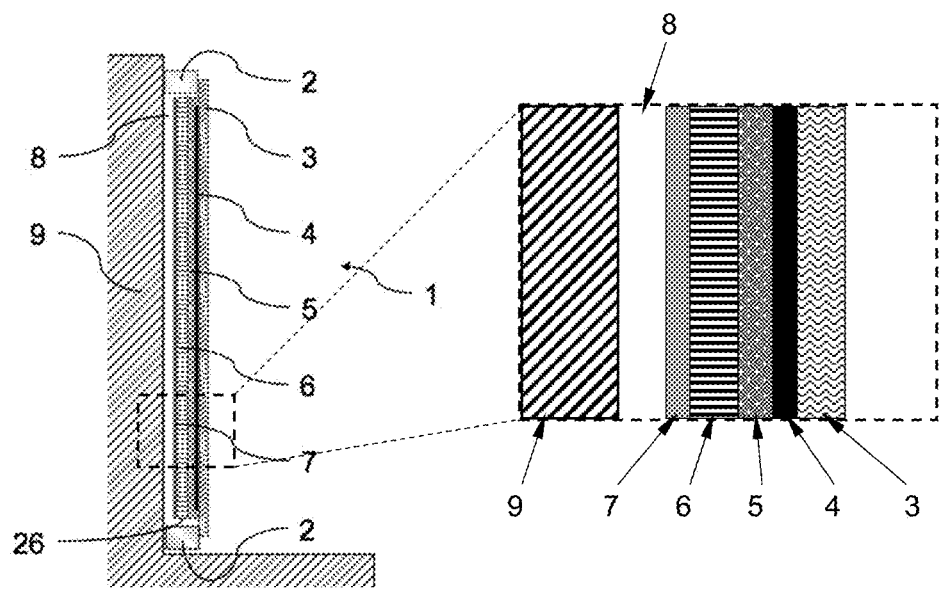
FIG. 1 is a two-dimensional view of a first embodiment of a temperature control system 1 according to the invention, wherein the inner air layer 6 is formed between the composite, which is composed of a heating element 4 directed toward the building shell or wall 9, a heat carrier 3 and a heat accumulator 5, wherein the entire composite is in thermally conductive contact, and an insulation and/or reflection element 7 which is preferably IR reflective on both sides and is applied as a cover skin to an open honeycomb core 26 which is mechanically connected to the heat accumulator 5, wherein the inner air layer 6 is formed within the honeycomb core 26, and wherein the entire composite 3, 4, 5 is fastened or can be fastened to the building shell or wall 9 via a single-layer spacer element 2, wherein an outer air layer 8 is formed by the spacer element 2 between the insulation and/or reflection element 7 and the building shell or wall 9.
Figure 2:
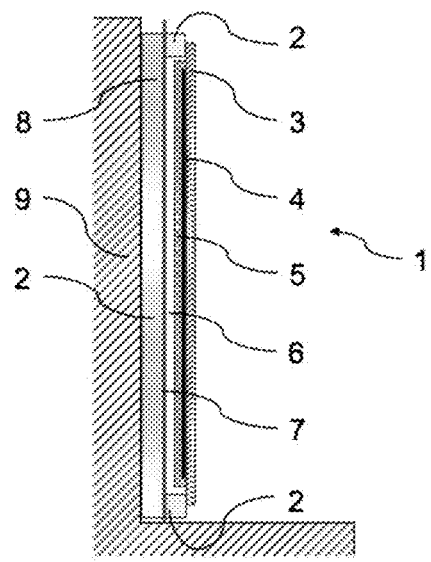
FIG. 2 shows, in a sectional two-dimensional view, a second embodiment of the temperature control system 1 according to the invention, in which an insulation and/or reflection element 7 which is preferably IR reflective on both sides will be or is fastened over the entire surface on a spacer 2 which is fixed on a building shell or wall 9, wherein an outer layer of air 8 is formed by the vertically applied spacer 2 between the insulation and/or reflection element 7 and the building shell or wall 9, and wherein a composite which is formed from a heating element 4 directed toward the building shell or wall 9, a heat carrier 3 and a heat accumulator 5, and the entire composite is in thermally conductive contact, is or can be fastened to a spacer element 2, wherein an inner air layer 6 forms between the insulation and/or reflection element 7 and the composite.

A preferred variant of a method for installing the temperature control system according to the invention from FIG. 1 with a composite element is shown schematically in FIGS. 5 to 8.

Figure 5:
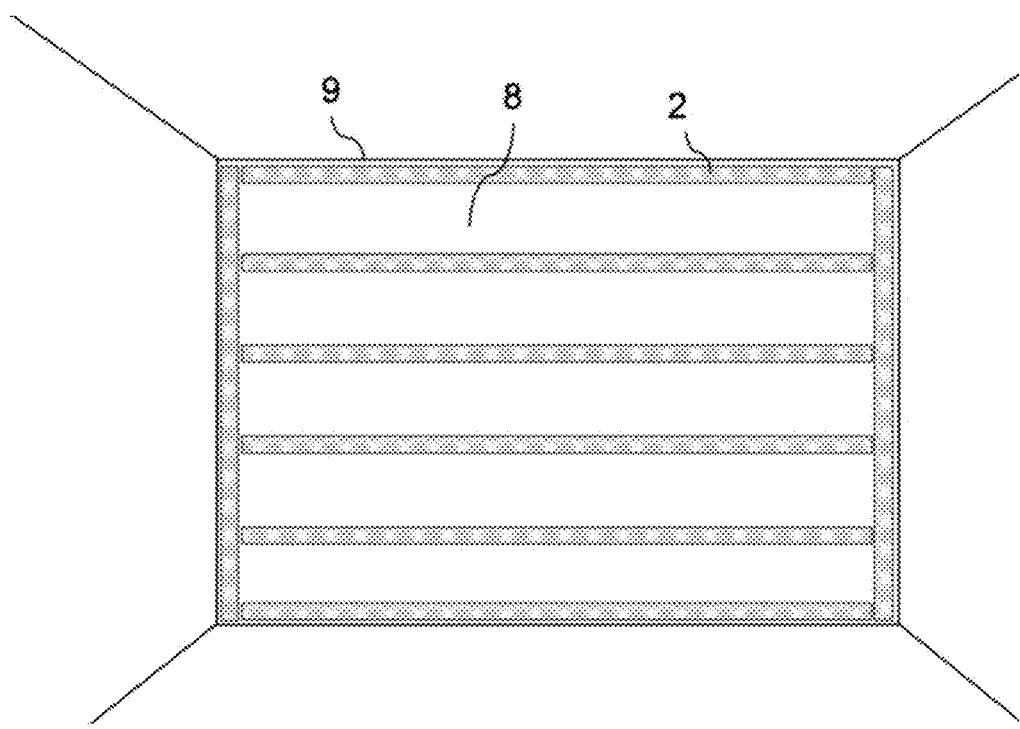

FIG. 5 shows the first step in which a spacer element 2, for example a batten made of impregnated scantlings, is applied as a substructure to a building shell or a wall 9 and thereby forms an outer air layer 8.

Figure 6:
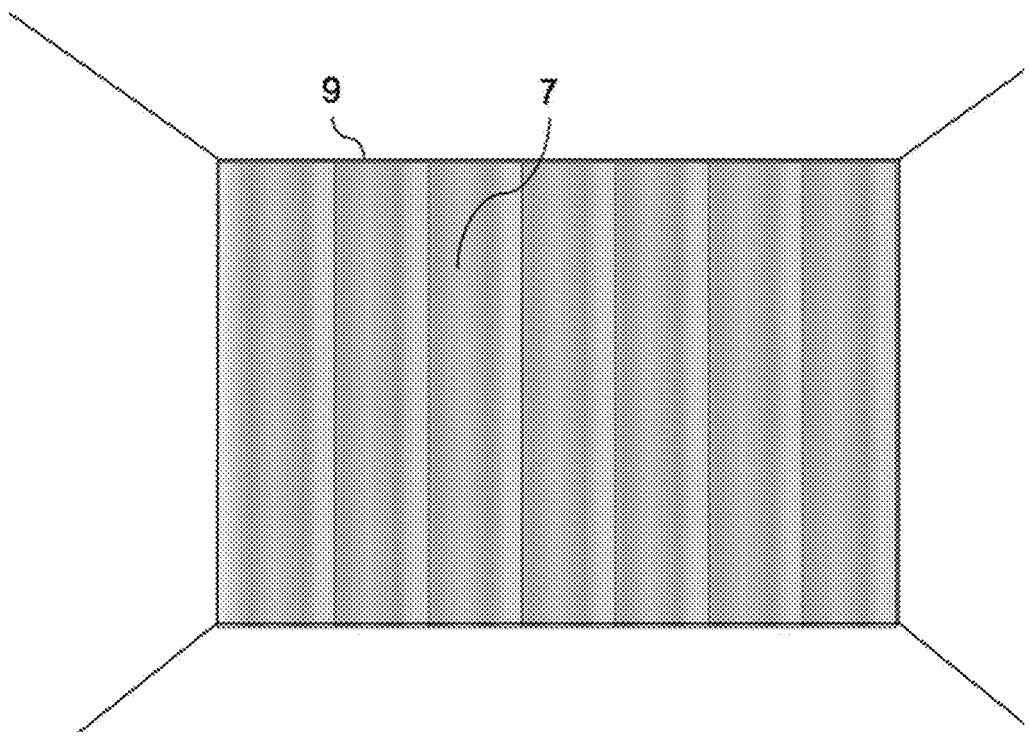

FIG. 6 shows, as the next step, the application of the insulation and/or reflection element 7 to the substructure from FIG. 5. The insulation and/or reflection element 7 is preferably IR-reflective on both sides so that radiant heat emitted by the composite component is reflected back into the room in order to reduce radiant heat losses via the building shell or via the wall 9 and to prevent the heating of a room in summer through back-reflection of exogenous radiant energy, such as for example solar radiation, diffuse radiation, ambient radiation and the like to the building outer shell 9.

Figure 7:
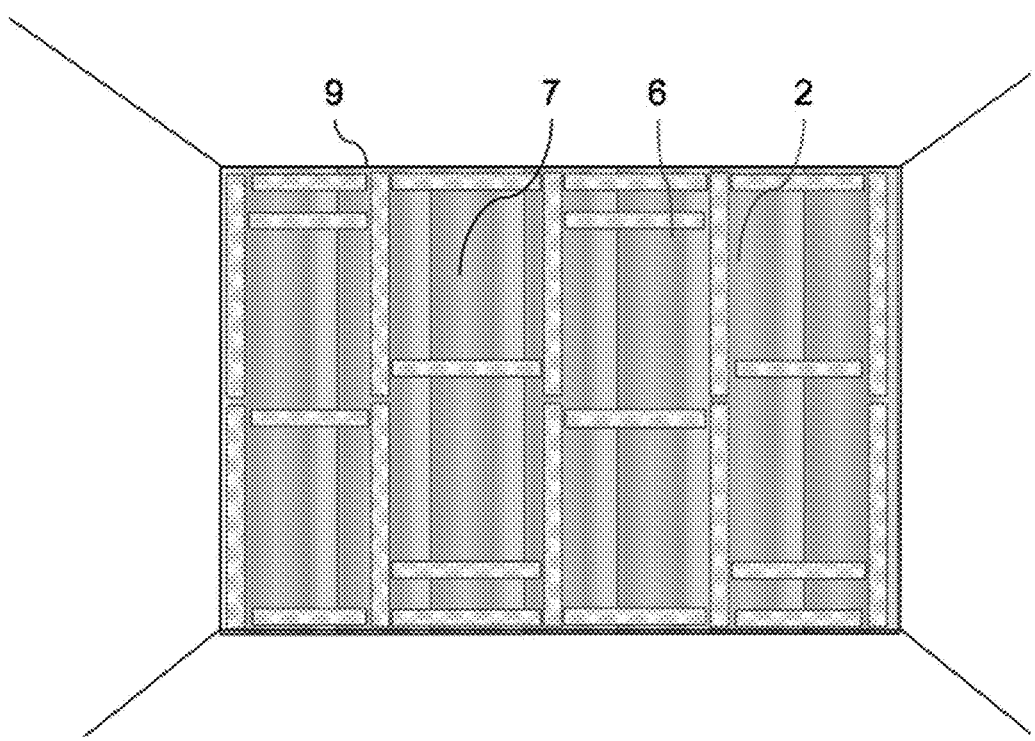

FIG. 7 shows schematically how a further spacer element 2, for example a lath made of impregnated scantlings, is applied to an insulation and/or reflection element 7, whereby an inner air gap 6 is created.

Figure 3:
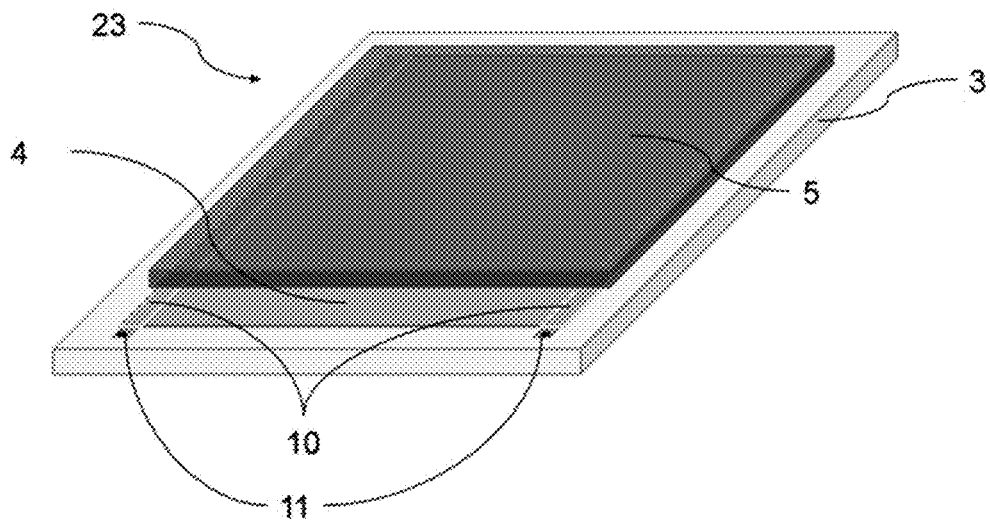
FIG. 3 shows, in a partially sectional three-dimensional view, the composite element 23 according to the invention of a temperature control system according to the invention, wherein the composite element is made up of
- a heating element 4 which is directed toward the heat accumulator 5 and is formed by a heating coating applied between two conductor tracks 10,
- a heat carrier 3 and
- a heat accumulator 5, wherein the entire composite is in thermally conductive contact and is connected to a voltage source by means of contact points 11.
Figure 4:
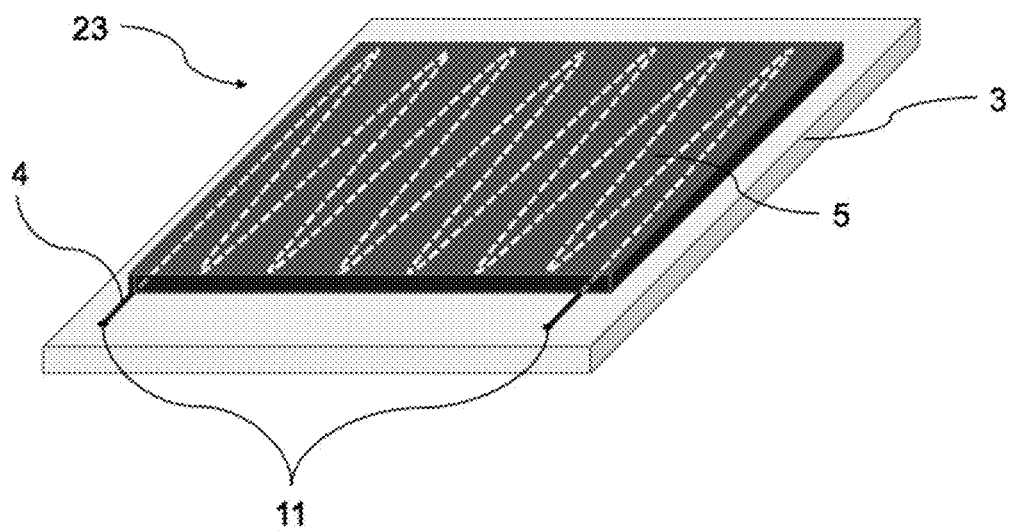
FIG. 4 shows, in a partially sectional three-dimensional view, the composite element 23 according to the invention of a temperature control system according to the invention, wherein the composite element is made up of
- a heating element 4 which is directed toward the heat accumulator 5 and, as an alternative to FIG. 3, is formed by a meander-shaped heating wire,
- a heat carrier (3) and
- a heat accumulator (5), wherein the entire composite is in thermally conductive contact and is connected to a voltage source by means of contact points 11.
Figure 8:
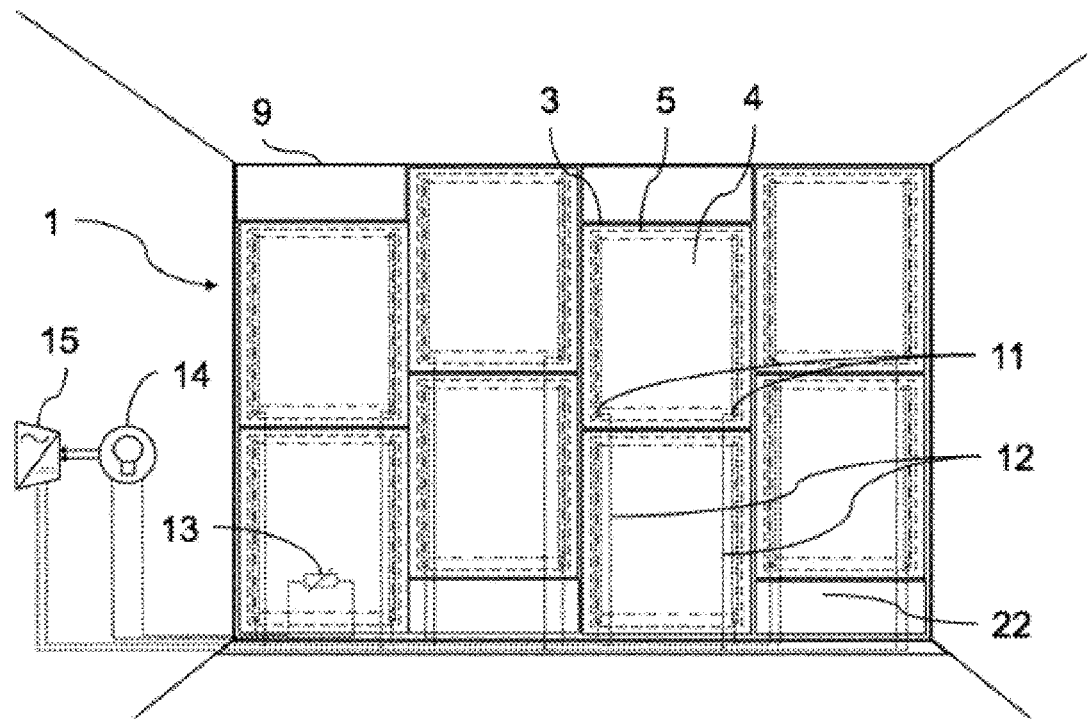

FIG. 8 shows the temperature control system 1 according to the invention after installation on the inner wall of a building shell 9. The composite element 23 is constructed according to FIG. 3 and consists of the heating element 4 directed towards the building shell 9, a heat carrier 3 which can be, for example, a 10 mm gypsum fiberboard, and a heat accumulator 5. The entire composite is in thermally conductive contact, and is fixed to the spacer element by means of screws. The wall areas that are not covered by the composite element are filled by means of panels, approximately 10 mm thick gypsum fiber panels 22. The conductive connections 12 are connected to the contact points 11 via plug-in or soldered connections and are connected to a 36 V DC voltage supply 15 which is safe to touch, for example, in order to apply the voltage. The heating function is controlled via a temperature sensor 13 attached to the rear of the composite element and a switching differential (hysteresis) which can be set via a thermostat 14 and which activates or deactivates the voltage supply 15 depending on the surface temperature measured by the temperature sensor 13.

Figure 9:
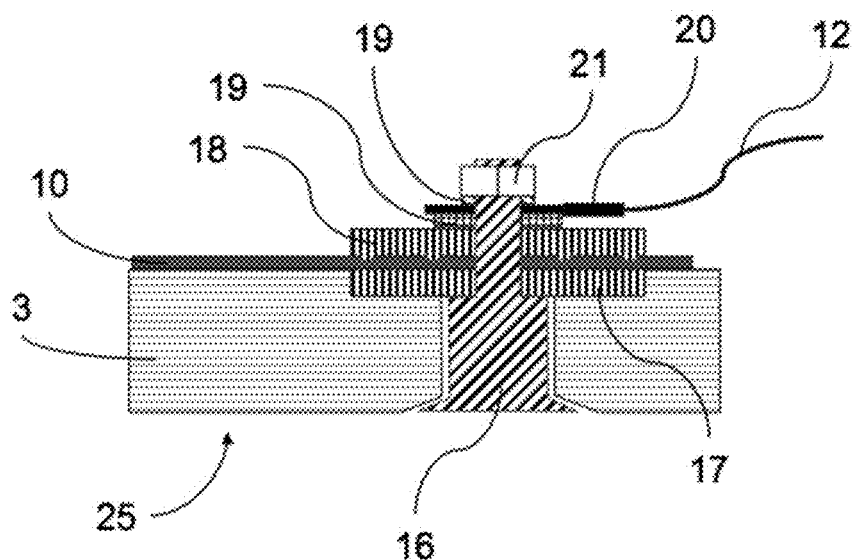

FIG. 9 shows a contacting system 25 for electrical contacting of the temperature control system according to the invention, which is used in particular for heat transfer media 3 that swell or shrink due to moisture-related changes in their material thickness. The conductor track 10 lies at the contact points between a contact disk 17 resting flush on the heat carrier 3 and a contact disk with teeth 18, wherein the teeth are permanently frictionally pressed by screwing the contacting bolt 16 to the threaded nut 21. The special feature of the contacting system is that the contacting bolt 16 is designed to float easily within the heat carrier 3 and, due to its structure, forms a continuous frictional connection with the contact disk. The contact disk with teeth 18 has at least 5 teeth on the side directed toward the conductor track 10. When the contacting bolt 16 is screwed to the threaded nut 21, the teeth are pressed into the conductor track 10, as a result of which the electrical contact resistance is minimized when the voltage of the voltage source 15 is applied. Between the contact disk with teeth 18 and the threaded nut 21 there are washers 19 and a cable lug 20 is inserted between them in order to ensure reliable electrical contact. The connection between the cable lug 20 and the conductive connection 12 takes place in a manner known per se.

Figure 10:
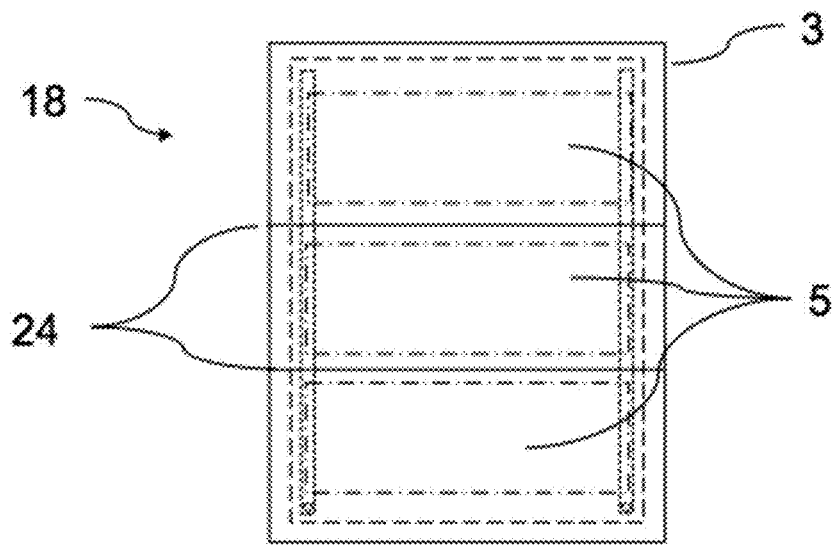

FIG. 10 is a two-dimensional schematic representation of the composite element 18 of the temperature control system according to the invention, in which, for example, three heating elements 5 which are implemented by an electrically conductive coating are applied to a heat carrier 3. The visual section lines 24 allow both a defined change in the electrical power output and the thermal output of the composite element 18 during installation by a person skilled in the art.

Figure 11:
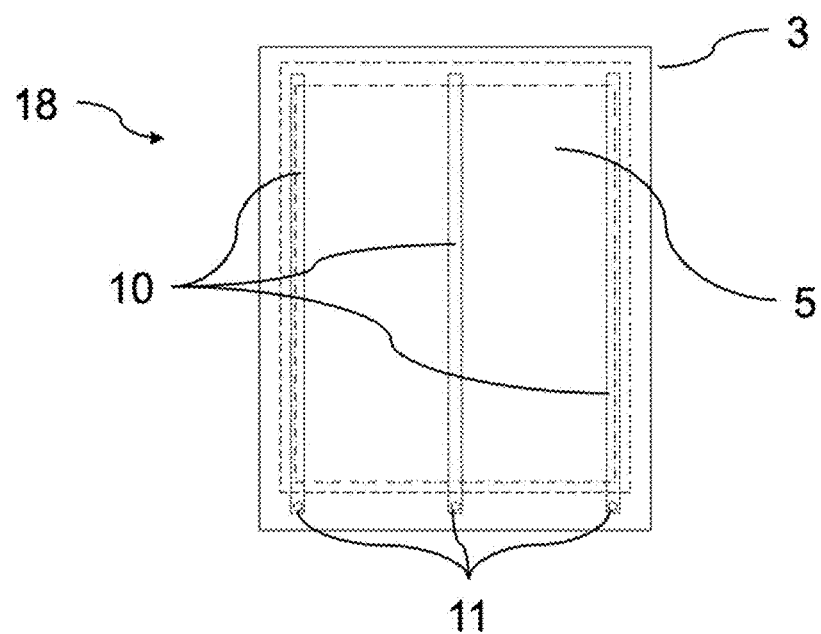

FIG. 11 shows a two-dimensional schematic representation of the composite element 18 of the temperature control system according to the invention with three conductor tracks 10 of a heating element 5, which is formed by an electrically conductive coating applied to a heat carrier 3. As a result, the width of a heating element 5 can be expanded by a further electrically conductive coating. In addition, by variation of the application of the electrical voltage of the voltage source 15 to the contact points 11, both a defined change in the electrical power output and also the thermal output of the composite element 18 can be implemented by a person skilled in the art during installation.

DETAILED DESCRIPTION

The temperature control system according to the invention provides a composite element or composite component, which is constructed as a composite of a heating element, a heat carrier and a heat accumulator, wherein the entire composite is in thermally conductive contact, wherein heat is fed to both the heat accumulator and the heat carrier via the heating element during the heating process. In a preferred embodiment, the temperature of the surface of the composite component adjoining the room side is between 20° C. and 50° C. and is limited to 40° C. in the accessible area of a wall and to 30° C. in the floor area.

The heat carrier can be based on any thermally conductive but electrically insulating substrate, wherein this substrate is preferably non-combustible and should have a calorific value of less than 3 MJ/kg. The dimensions of the heat carrier are primarily dependent on the dimensions of the room in which the temperature is to be controlled. To avoid loss of space and to allow rapid heating rates, the thickness D of the heat carrier corresponds to that of material thicknesses commonly used in interior construction, preferably e.g. D=10 mm, 15 mm, 20 mm or other thicknesses, and its length L and width B allow manual installation by one or two specialists and correspond to the material dimensions common in interior construction, preferably e.g. L=50 cm, 75 cm, 100 cm, 150 cm, 200 cm and B=50 cm, 75 cm, 100 cm, 150 cm, 200 cm or different lengths and widths.

The heat carrier is in a thermally conductive connection to the heating element, wherein during the heating process the heating element heats the heat carrier, which emits the introduced heat primarily in the form of infrared waves, for example into a room. The solid bodies located in the room, such as living beings or objects, absorb the radiation and give it off as heat to the room.

At least one single heating element but also a plurality of heating elements can be arranged on the heat carrier. The heating element can be implemented using a wide variety of designs, such as liquid-conveying pipelines, textiles with integrated electrical heating wires, electrical heating wires, electrically conductive foils, electrically conductive fibers or an electrically conductive coating which is meander-shaped or preferably applied over the entire surface, and can be applied to the surface facing away from the room or on the surface facing the room or can be embedded (integrated) in the heat carrier.

In a preferred embodiment, in particular for a composite component for the wall for heating a room, the electrical resistance of the heating element is low, so that it can be operated with a touch-safe protective extra-low voltage of 1 V to 25 V AC or 1 V to 60 V DC, preferably 36 V DC can be operated.

The mechanical and thermally conductive connection between the heat carrier and the heating element can be established in common ways, such as clamping connections for pipelines, gluing, screwing, pressing for textiles with integrated electrical heating wires or electrical heating wires or electrically conductive foils or electrically conductive fibers, as well as printing technologies in the case of conductive coatings.

In a preferred use of electrically conductive coatings as a heating element, at least two current-carrying conductor tracks running parallel to one another are provided to apply the electrical energy. The conductor tracks are to be applied at least over the entire length of one or more heating elements so that current can flow through the heating element over the entire area and no hotspots can form in the upper and/or lower edge area of the heating element.

According to the Stefan-Boltzmann law of radiation, the surface area proportion of the heating element in relation to the lateral dimensions of the composite component is represented over the fullest possible area in order to maximize the heat radiation output. In a preferred development, an electrically conductive coating, such as a carbon coating, is used to design the heating element. The surface area proportion of the heating element can be, for example, 50%, preferably at least 60%, preferably at least 70%, preferably at least 80%, even more preferably at least 90%.

The conductor tracks can consist of various electrically conductive materials such as copper, silver or other alloys and are applied in processes which are known per se such as printing, spraying, doctoring, pressing or gluing both under the conductive coating on the heat carrier and on the conductive coating. The dimensioning and material selection of the conductor tracks are carried out taking into account the applied voltage and electrical power. The conductor tracks must have the required current-carrying capacity in order to ensure that the voltage is applied reliably to one or more heating elements connected to the conductor tracks.

The width of the conductor tracks should be selected so that the internal dimension between the conductor tracks is greater than zero. For assembly purposes, a distance of at least 1 cm from the outer edges of the conductor tracks to the edge areas of the heat carrier must be provided on all sides.

In a preferred embodiment with a conductive coating, self-adhesive copper tapes with a width of 10 to 40 mm running parallel to one another are applied in each case as conductor tracks to a two-dimensional heat carrier commonly used in interior construction, such as a 10 mm thick gypsum fiberboard, to apply the voltage to the heating element, and the electrically conductive coating is applied to the heat carrier by means of known printing processes, for example flat-bed screen printing, spraying or wiping with a doctor blade, wherein this coating at least covers the width of the copper tracks. The thickness (D) of the copper tape in this embodiment is preferably 50-100 µm.

In a further development, for example, on the side of a heat carrier (e.g. a gypsum fiber board with a length L=1000 mm, width B=750 mm and thickness D=10 mm and an emissivity ε of 0.92) facing away from the room, a conductive coating (e.g. based on carbon, with heating surface area proportion of 75% and an electrical resistance R=20 Ohm) is connected by means of the contact points of a conductor track (e.g. with a width B=25 mm and a thickness D=0.05 mm) to a voltage of 36 V DC, whereby according to the Stefan-Boltzmann law of radiation at a room-side surface temperature of 40° C. a heat radiation output $Q_w$ of approximately 300 W/m² is realized, while the electrical power output P is only approximately 117 W/m². This also reveals the great advantage of surface heating systems over alternative heating systems.

In one embodiment, the subject matter of the composite component according to the invention provides more than one (such as at least 2 to 20, or more) heating element on a heat carrier, wherein individual heating elements are preferably identified by, for example, visual marking lines on the front face of the heat carrier. The marking lines serve as an aid to reducing the size of the composite component, which in particular has the advantage that if the composite component is reduced in size during installation, an exact calculation of the electrical power output, the heating output and the heat radiation output based on the number of remaining heating elements is guaranteed by the qualified installer.

The contacting of the conductor tracks with the voltage source can take place, for example, with electrical lines, wherein a permanently secure conductive connection between the electrical line and the conductor track as well as a secured mechanical connection (e.g. by a clamping connection, plug connection, adhesive connection) between the electrical conductor, the conductor track and the heat carrier should be ensured.

In one embodiment, an electrical line can be electrically contacted with the conductor track via a soldered connection, the soldering point can be electrically insulated with a potting compound, for example, and the electrical line can be mechanically connected to the heat carrier via strain relief clamps, so that, for example, tearing off of the conductor track due to negligent handling of the electrical line is avoided.

In a further embodiment with, for example, an electrically conductive coating, a self-adhesive copper tape running parallel to each other can be applied as a conductor to a two-dimensional heat carrier commonly used in interior construction, such as a 10 mm thick gypsum fiber board, to apply the voltage to the heating element. At the respective contact points of the conductor tracks, the heat carrier has a through hole, which was created, for example, by drilling. In the center of the hole between the conductor track and the heat carrier, a perforated contact disk is inserted flush with the heat carrier, the dimensions of which correspond at least to the width of the conductor track. From the side of the heat carrier facing away from the applied heating element, a connecting element, for example a threaded contacting bolt, is inserted through the hole into the heat carrier. It is of particular importance that the contacting bolt exerts an unimpeded contact pressure on the contact disk and is preferably flush with the heat carrier on the insertion side. On the side facing the heating element, (1) a further perforated contacting disc, which has a toothing for better electrical connection to the conductor track and of which the dimensions correspond at least to the width of the conductor track,
(2) if necessary, a washer for secure mechanical fixing and for electrical contacting, and
(3) a cable lug for secure electrical contact with the conductive connection and the power supply, and
(4) if necessary, a washer for secure mechanical fixing and for electrical contact, are placed onto the contact bolts, preferably in the following order, and
(5) for secure mechanical fixing as well as for electrical contact the composite is pressed by a screw nut, for example.

The advantage of this connection element is that moisture-related changes in the material thickness (due to swelling or shrinking) of the heat carrier, such as for example a gypsum fiber board, ensure a constant mechanical and electrical frictional connection between the conductive connection and the conductor track.

The heat accumulator can be embodied by any thermally conductive but electrically insulating substrate, wherein this is preferably non-combustible and has a calorific value of less than 3 MJ/kg. In the thermally conductive connection the heat accumulator is applied in a manner known per se, such as gluing, screwing, pressing, jamming or riveting, onto the inner side of the heat carrier, wherein it is irrelevant whether the heating element is in a thermally conductive connection to the inner or outer side of the heat carrier, is integrated in these or in a combination thereof.

The dimensions of the heat accumulator are primarily dependent on the dimension of the heat carrier and, with regard to its thickness D, on the depth of the spacer. In a preferred embodiment, in order to avoid loss of space, the maximum thickness D of the heat carrier corresponds to the construction depths common in interior construction, in particular the battens of drywall panels, for example D=5 mm, 10 mm, 15 mm, 20 mm or deviations therefrom.

The heat accumulator is mounted horizontally and vertically centrally above a heating element in a plan view and preferably projects over the entire area thereof. The minimum coverage corresponds in its area to at least a partial area of the heating element of at least 50%, preferably at least 60%, preferably at least 70%, preferably at least 80%, even more preferably at least 90%. For assembly purposes, a distance of at least 1 cm from the outer edges of the heat accumulator to the edge areas of the heat carrier must be provided on all sides.

The specific thermal capacity of the heat accumulator is preferably greater than that of the heat carrier. A suitable thermal capacity can be, for example, at least 1,000 J/kgK, preferably at least 2,000 J/kgK, preferably at least 3,000 J/kgK, preferably at least 4,000 J/kgK, even more preferably above 4,000 J/kgK.

In an embodiment with a calorific value of the heat accumulator of over e.g. 3 MJ/kg, in which the heat accumulator would be in direct thermally conductive contact with the heating element, a fire barrier of which the surface area corresponds at least to the surface area of the heat accumulator is to be used between the heating element and the heat accumulator. The fire barrier can consist of any thermally conductive but non-combustible material such as glass fiber mats, thermal fillers or other coatings. Depending on the design, the fire barrier can be applied to the heating element or the heat accumulator in a manner known per se, or it can be laid between the heating element and the heat accumulator. The thickness (D) of the fire barrier is kept to a minimum, for example at most 2 mm, preferably at most 1 mm, even more preferably less than 1 mm.

In a preferred embodiment, the specific weight of the individual components of the composite component, which is constructed as a composite of a heating element, a heat carrier and a heat accumulator, wherein the composite is in thermally conductive contact, allows the manual installation of the composite component by one or two skilled workers.

In one variant of an embodiment, the heat accumulator is formed by a latent heat accumulator, also a phase change material (PCM). PCM storage materials which are known per se are, for example, paraffins or salt hydrates. During the heating process of the heating element, the heat accumulator, which is in thermally conductive contact with the heating element and the heat carrier, undergoes a phase change at, for example, 25° C. or 26° C. or 27° C. or 28° C. or 29° C. or 30° C., wherein it changes its physical state and stores the thermal energy emanating from the heating element and the heat carrier as latent heat. After the heating element is switched to inactive by means of the switching differential or for other reasons, the composite consisting of a heating element, a heat carrier and a heat accumulator, wherein the entire composite is in thermally conductive contact, is in the cooling phase. During the cooling phase of the composite, the PCM storage material goes through a phase change at, for example, 45° C. or 44° C. or 43° C. or 42° C. or 41° C. or 40° C. or 39° or 38° C. or 37° C. or 36° C. or 35° C., whereby it changes back to its original physical state and the cooling phase of the composite is significantly delayed. The particular advantage of the inventive composite component with PCM-based heat accumulator is its high heat storage capacity and the associated heating efficiency.

The particular advantage of the heating element in the composite with a heat carrier and a heat accumulator, wherein the entire composite is in thermally conductive contact, is based on a significant extension of the switching cycles within the set hysteresis, since the cooling time of the composite component is significantly delayed when the heating element is inactive, and the net operation and thus the energy requirement for heating, for example of a room in a building, is reduced. Series of measurements have shown savings of over 30% compared to conventional heating systems.

It should also be emphasized that by the use of the heating element in the composite with a heat carrier and a heat accumulator, wherein the composite is in thermally conductive contact, the composite component according to the invention compared to conventional heating systems, with the same power output, a higher surface temperature and thus a higher surface temperature according to the Stefan-Boltzmann law of radiation, a significantly higher heat radiation output $Q_w$ is achieved and, as a result, requires less energy to heat a room, such as the room of a building.

A further advantage of the inventive solution is that the temperature control system supports the heat protection, for example of a room, in summer, in particular if the composite component is attached to an outer wall, sloping roof or ceiling of a building shell via spacers on the inside of a room. The heat accumulator directed towards the building shell ensures a phase shift, i.e. a time lag, in which the daily maximum temperature passes through the building shell and the temperature control system from the outside to the inside and buffering of the thermal energy acting from the outside, which is only passed on to the interior in reduced quantities (amplitude damping). An optimal phase shift is in the range of 10-12 hours, since the heat that arrives in the interior in the evening hours can be ventilated with the coolness of the evening.

In one embodiment, further components can be part of the temperature control system according to the invention. For example, thermal gap fillers in a composite element can ensure maximum tolerance and maximum gap compensation and thus can minimize thermal coupling losses between the individual components and, as a result, reduce energy losses.

The insulation and/or reflection element is preferably attached without contact between, for example, a building shell and the composite component. In order to guarantee a heat radiation reflecting property of the insulation and/or reflection element, a permanent emissivity ε of at least less than 0.5, preferably at least less than 0.1, more preferably at least less than 0.05, is advantageous.

In order to reflect radiant heat emitted by the composite component back into a room and thus to reduce radiant heat losses through the building shell and avoid heating up of a room in summer due to back-reflection of exogenous radiant energy, such as solar radiation, diffuse radiation, ambient radiation and the like, to the outer shell of the building, the insulation and/or reflection element is designed to be reflective on both sides and is attached via spacer elements, preferably free of contact, with adjacent inner and outer air layers between the building shell and the composite component.

In a simple embodiment the insulation and/or reflection element consists of a high-gloss metal foil, for example aluminum, which preferably has an electrical insulation layer and is protected against tarnishing, for example with a polyester layer, in order to counteract fading of the insulation and/or reflection element over time and thus to counteract a deterioration of the heat radiation reflection. The thickness D of such an insulation and/or reflection element is, for example, D=0.1 mm to 0.9 mm.

In a preferred embodiment the insulation and/or reflection element is a composite foil which has at least one, preferably at least two, preferably at least three, preferably at least four, preferably at least five, more preferably at least more than five IR-reflecting layers and at least one, preferably at least two, preferably at least three, preferably at least four, preferably at least five, more preferably at least more than five air cushion layers. The use of such an insulation and/or reflection element makes it possible, in addition to the aforementioned IR reflection properties, to increase the thermal resistance of a building, for example, and thus to reduce the energy requirement for controlling the temperature, for example of a room. The thickness D of an insulation and/or reflection element with IR reflection properties and thermal insulation properties is at least 5 mm, preferably at least 10 mm, preferably at least 20 mm, preferably at least 50 mm, preferably at least 100 mm, even more preferably over 100 mm.

In one embodiment of the inventive solution, the insulation and/or reflection element is applied in combination with the composite element on the side of the heat accumulator directed toward the building shell or the wall. In this embodiment, in order to maintain the IR reflection properties, the insulation and/or reflection element and the heat accumulator are not in a full-surface composite, but are separated by, for example, an open honeycomb core, wherein the insulation and/or reflection element is applied to the side of the honeycomb core facing away from the heat accumulator as a cover skin of the honeycomb core. The honeycomb core thus serves, on the one hand, as a spacer element between the heat accumulator and the insulation and/or reflection element. On the other hand, the honeycomb core forms the inner air layer or the inner air gap between the heat accumulator and the insulation and/or reflection element.

The honeycomb core can be produced in ways which are known per se from, for example, cardboard, resin-impregnated paper, fiber-reinforced plastics or thin aluminum foils and has a thickness D of, for example, D=5 mm or D=10 mm or D=15 mm or D=20 mm. The combination of the insulation and/or reflection element with the composite element takes place in a manner known per se, for example by gluing, clamping, screwing. The advantage of this embodiment lies in the simplified and shortened installation time of the temperature control system.

The honeycomb core can have any open lattice or honeycomb structure; it is merely necessary to ensure that the honeycomb core enables the formation of the inner air layer or the inner air gap.

When installed on the inner side of an external wall of a building, for example, the insulation and/or reflection element can be formed as a diffusion-closed insulation and/or reflection element in order to prevent diffusion of moisture from the warm indoor air in the building shell and thus damage to underlying components, in particular thermal insulation composite systems, from condensation. The foil is installed on the spacer element in a manner known from vapor barrier films or vapor-proof films, for example by stapling or gluing or screwing.

According to the invention, the spacer element is designed in such a way that in a preferred embodiment it ensures a contact-free distance of the insulation and/or reflection element between the composite component and the building shell, it forms an inner and outer layer of static air relative to the adjacent sides of the insulation and/or reflection element, and it supports a secure mechanical fastening of the composite component on the room side of the building shell.

In one embodiment of the invention, for example when used for controlling the temperature of a room in a building, the spacer element can consist of materials that are known from substructures for drywall construction, for example wooden profiles, as in wooden frameworks, or metal U- or C-profiles, as in metal frameworks, wherein the profiles have, for example, a width B of B=30-50 mm and a thickness D of D=20-40 mm.

In one embodiment of the invention, in a first step, a substructure made of impregnated scantlings with B=50 mm and D=20 mm is fastened to the wall or ceiling and floor, in a second step, the reflection element or reflective insulation element is applied to the substructure, and in a third step, for spacing of the composite component a fastening frame made of impregnated scantlings with, for example, B=50 mm and D=20 mm is applied to the insulation and/or reflection element and connected to the substructure.

The spacer element can be fastened in a known manner, for example by riveting, screwing, stapling or nailing. In the case of an additional function of an insulation and/or reflection element as a vapor barrier or vapor proofing, the work steps known for this must be observed.

When the temperature control system according to the invention is used on a wall or ceiling directed toward the building shell, a particular advantage of the spacer element lies in the resulting double air layer between the building shell and the composite component since, due to the average thermal resistance of R=0.17 (m²K)/W for static air layers between building material surfaces, a heat displacement from the building shell into the interior of the room and from the interior of the room to the building shell is effectively reduced and the requirements and thus costs for thermal insulation measures for the building are reduced.

REFERENCE SIGNS 1 temperature control system
2 spacer element
3 heat carrier
4 heating element
5 heat accumulator
6 inner air gap or inner air layer
7 reflection element or reflective insulation element
8 outer air gap or outer air layer
9 building shell or wall
10 conductor track
11 contact point
12 conductive connection
13 thermal sensor
14 control or thermostat
15 DC power supply
16 contacting bolts
17 contact disk
18 contact disk with teeth
19 washer
20 cable lug
21 threaded nut
22 blanking panels
23 composite component
24 section line
25 contacting system
26 honeycomb core

I claim:

1. A temperature control system for temperature control of a room, comprising:

a heating element (4) with a surface facing the room and a surface facing away from the room, an insulation and/or reflection element (7) which is arranged or can be arranged spaced apart from the heating element (4) and on the surface of the heating element (4) facing away from the room, so that an inner air gap (6) is formed between the insulation and/or reflection element (7) and the heating element (4), wherein the insulation and/or reflection element (7) is designed to be heat-insulating and reflective to IR beams, a first spacer element (2) which is arranged or can be arranged on the surface of the insulation and/or reflection element (7) facing away from the room in order to form an outer air gap (8) between the insulation and/or reflection element (7) and a wall (9) of the room, and wherein a second spacer element is arranged between the insulation and/or reflection element and the heating element, wherein the second spacer element has an open lattice or honeycomb structure, so that the inner air gap is formed within title open lattice or honeycomb structure.

2. The temperature control system according to claim 1, wherein the insulation and/or reflection element (7) is designed to be flat and reflective to IR beams on both sides.

3. The temperature control system according to claim 1, wherein a heat accumulator (5) is or can be arranged on the surface of the heating element (4) facing away from the room.

4. The temperature control system according to claim 3, wherein the heat accumulator (5) is arranged between the heating element (4) and the insulation and/or reflection element (7) and spaced apart from the insulation and/or reflection element (7).

5. The temperature control system according to claim 1, wherein a heat carrier (3) is or can be arranged on the surface of the heating element (4) facing the room.

6. The temperature control system according to claim 5, wherein the heat carrier (3), the heating element (4) and a heat accumulator (5) arranged on the surface of the heating element (4) facing away from the room are in thermally conductive contact.

7. The temperature control system according to claim 6, wherein the heat carrier (3), the heating element (4) and the heat accumulator (5) are designed together as a composite element.

8. The temperature control system according to claim 7, wherein the insulation and/or reflection element (7) and optionally the second spacer element are part of the composite element.

9. The temperature control system according to claim 1, wherein the heating element (4) comprises:

a conductive coating to which electrical energy can be applied,
a heating wire,
a water pipe,
and combinations thereof.

10. The temperature control system according to claim 1, wherein the insulation and/or reflection element (7) comprises:

a high-gloss metal foil, or
a composite foil which has at least one layer that reflects IR beams and at least one layer designed as an air cushion.

* * * * *